June 23, 1942.  M. RABB  2,287,273
TIRE TREAD GAUGE
Filed Nov. 29, 1941
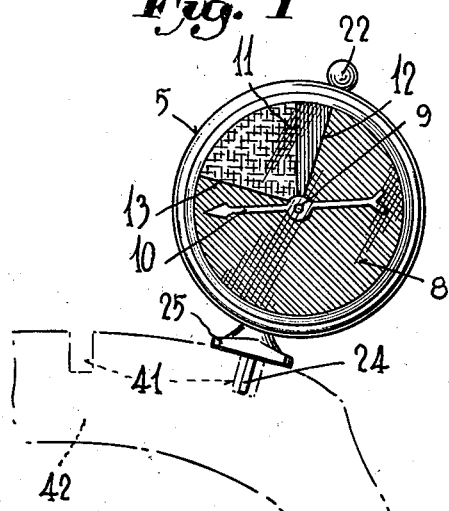
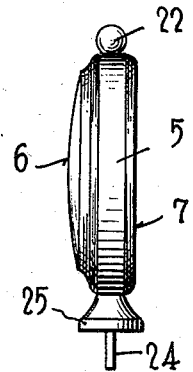
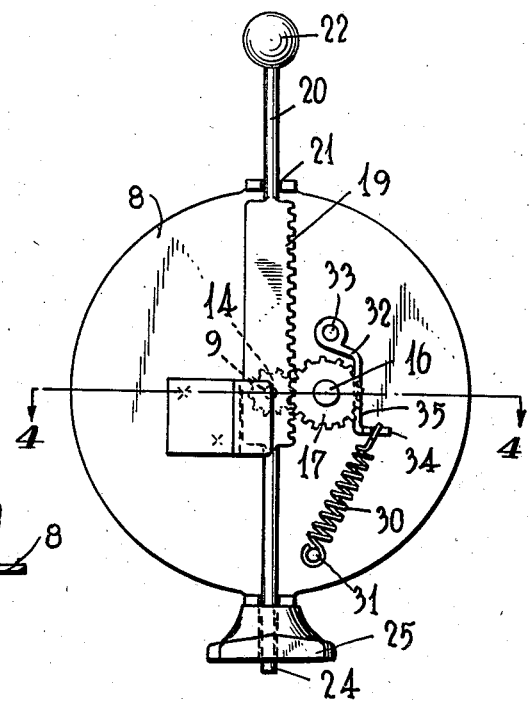
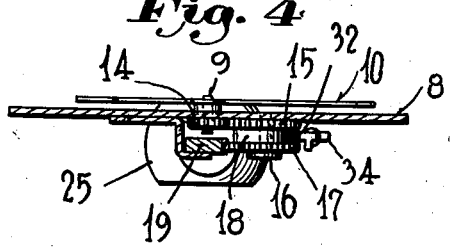
Inventor
Michael Rabb,
By Seymour, Bright & Nottingham
Attorneys Patented June 23, 1942

2,287,273

UNITED STATES PATENT OFFICE 2,287,273

TIRE TREAD GAUGE

Michael Rabb, Newark, N. J., assignor to Atlas Supply Company, Newark, N. J., a corporation of Delaware Application November 29, 1941, Serial No. 421,052

6 Claims. (Cl. 33—172)

This invention relates to a tire tread gauge, and the primary object thereof is to provide indicating means to show the depth of the effective anti-skid portion of the tread of a pneumatic tire.

Another object is to supply a gauge of simple, inexpensive construction which will permit a filling station attendant to gauge the tire tread and then show the result to the motorist, so that the latter may determine whether the tire lacks anti-skid qualities and should be either discarded, retreaded or recut.

A further object is to furnish a tire tread gauge having indicating means that may be readily understood by the owner of an automobile to aid him in judging the anti-skid qualities of the tires of his car.

A still further object is to produce a simple and inexpensive tire tread gauge, and yet one which will be exceedingly effective for the purpose for which it is designed.

With the foregoing objects outlined and with other objects in view which will appear as the description proceeds, the invention consists in the novel features hereinafter described in detail, illustrated in the accompanying drawing, and more particularly pointed out in the appended claims.

In the drawing:

Fig. 1 is a front elevation of my improved gauge shown in use with a portion of a tire, illustrated in cross-section by dot and dash lines.

Fig. 2 is an elevation taken at right angles to Fig. 1.

Fig. 3 is an enlarged elevation of the mechanism of the gauge shown removed from the casing thereof.

Fig. 4 is a horizontal sectional view taken on the line 4—4 of Fig. 3.

Referring to the drawing, 5 designates a circular case having a crystal 6 at the front thereof, and a removable back 7 at the rear. Within the case there is a disc-shaped plate 8 having a central hole in which rotates a shaft 9. An indicating pointer or hand 10 is fixed to the shaft at the front of the plate 8 so that it may be seen through the crystal 6, and as best shown in Fig. 1, the front of the plate is calibrated by radial lines 11, 12 and 13. The area between the lines 12 and 13 may be colored green; between 13 and 11, yellow; and between 11 and 12, red, for a purpose hereinafter described.

Rearwardly of the plate 8, a pinion 14 is fixed to the shaft 9, and this pinion meshes with a larger pinion 15 rotatably mounted on a stud 16 which is fixed to and projects rearwardly from the plate. Another pinion 17 of the same size as pinion 15 is integral with that pinion and is spaced therefrom by a cylinder 18 rotatable with both pinions 15 and 16.

Pinion 17 meshes with the teeth of a rack bar 19 which slides vertically and is provided at one end with a combined guide rod and push pin 20. The latter slides in a notch 21 in the plate 8, and the upper end portion of the guide rod is provided with a ball or button 22.

A gauge pin or plunger 24 is fixed to the lower end portion of the rack 19, and slides through a stationary gauge element or stop 25 that is rigid with the lower end portion of the plate 8.

As it is desirable that the parts 10, 22 and 24 temporarily remain in the positions to which they have been moved in a gauging operation, a brake is provided for the combination wheel 15, 17, 18. For example, a leaf spring 32 may have one of its ends rockably mounted on a pin 33 projecting from the rear of the plate 8, and the opposite end portion 34 of the spring is connected by a coil spring 30 to a fixed pin 31, for operating purposes. The intermediate portion of the spring 32 is of linear shape, as indicated at 35, to frictionally engage the cylinder 18. As long as such frictional engagement takes place, the parts 14, 17, 18 and 19 will remain in any position to which they have been moved when the gauge pin is forced toward the shaft 9.

The device is operated by inserting the plunger or gauge pin 24 into an indentation 41 in the tread 42 of a tire, and pressing on the casing 5 until the stop 25 rests on the tread of the tire. This causes hand 10 to turn and ball 22 to rise. If the hand comes to rest on the green portion of the dial, the tire has adequate anti-skid qualities. The tire is still safe as to anti-skid properties if the pointer comes to rest on the yellow section of the tire. However, this indicates considerable wear. Should the hand come to rest on the red portion of the dial, the tire lacks anti-skid qualities and should be either discarded, retreaded or recut.

Regardless of where the hand 10 comes to rest, when the plunger moves toward the casing, the portion 35 of the brake spring will act to hold the hand in the position to which it has been moved. Then, in order to reset the device, the operator will simply press the head 22 toward the case 5.

From the foregoing it is believed that the construction, operation and advantages of the invention may be readily understood, and I am aware that changes may be made in the details disclosed without departing from the spirit of the invention, as expressed in the claims.

What I claim and desire to secure by Letters Patent is:

1. A tire tread gauge comprising a casing having a member projecting from the interior to the exterior thereof, a toothed element in the casing connected to said member, a toothed pinion having its teeth meshing with the teeth of the toothed element, a brake operatively connected with the pinion for resisting movement of the latter, an indicator dial in the casing visible from the exterior thereof, a pointer cooperating with the dial, means operatively connecting the pointer to said pinion, and manually operated means cooperating with the toothed element to return the pointer to zero.

2. A tire tread gauge comprising a casing having an axially movable plunger member projecting from the interior to the exterior thereof, a toothed element in the casing movable with said member, a toothed pinion having its teeth meshing with the teeth of the toothed element, a brake operatively connected with the pinion for resisting movement of the latter, an indicator dial in the casing visible from the exterior thereof, a pointer cooperating with the dial, means operatively connecting the pointer to said pinion, and manually operated means cooperating with the toothed element to return the pointer to zero.

3. A tire tread gauge comprising a casing having a member projecting from the interior to the exterior thereof, a toothed element in the casing movable with said member, a first toothed pinion having its teeth meshing with the teeth of the toothed element, a cylinder fixed to and arranged coaxial with said pinion, a brake frictionally engaging said cylinder for resisting movement of the pinion, an indicator dial, a pointer cooperating with the dial, means operatively connecting the pointer to said cylinder, and manually operated means operable from the exterior of the casing and engageable with said toothed element for moving the pointer to zero position.

4. A tire tread gauge comprising a casing having a stop at the exterior thereof, a plunger member slidable through said stop and projecting from the interior to the exterior of the casing, a toothed rack element in the casing fixed to and arranged coaxial with said member, a toothed pinion having its teeth meshing with the teeth of the toothed element, a brake operatively connected with the pinion for resisting movement of the latter, an indicator dial in the casing visible from the exterior thereof, a pointer cooperating with the dial, means operatively connecting the pointer to said pinion, and manually operated means cooperating with the toothed rack to return the pointer to zero.

5. A tire tread gauge comprising a casing having a plunger projecting radially therefrom, a stop fixed to the casing and through which the plunger is axially movable, a toothed rack arranged in the casing and secured to the inner end of the plunger, a toothed pinion having its teeth meshing with the teeth of the rack, a second toothed pinion movable with the first mentioned pinion, a cylinder arranged between and rigidly united with said pinions, a brake having a substantially linear shaped portion frictionally engaging the cylinder, means pivotally securing one end of the brake in the casing, spring means engaging the opposite end of the brake for moving its linear shaped portion into frictional engagement with the cylinder, a plate arranged within the casing, an indicator dial positioned on the plate and visible from the exterior of the casing, a pointer cooperating with the dial, and means operatively connecting the pointer with said second pinion.

6. A tire tread gauge comprising a casing having a crystal at one side thereof, a stop secured to the casing and arranged at the exterior thereof, a plunger slidable in the stop and projecting from the interior of the casing through said stop, a circular plate arranged in the casing, a toothed rack arranged diametrically of the plate at one side thereof and having one of its ends secured to the plunger, a guide rod fixed to the opposite end of the plunger and projecting from the casing, a push button at the outer end of the guide rod, a toothed pinion rotatably supported by the plate and meshing with the teeth of the rack, a second pinion coaxial with the first pinion, a cylinder arranged between and rigidly united with the pinions, a leaf spring having one of its ends rockably secured to the plate, said leaf spring having a linear shaped portion frictionally engaging said cylinder, means connected to the opposite end of the leaf spring for moving said linear shaped portion into engagement with said cylinder, a dial positioned on the plate and facing said crystal, a pointer cooperating with the dial and arranged between the plate and crystal, a shaft on which the pointer is rigidly mounted, and a third pinion fixed to said shaft and meshing with said second pinion.

MICHAEL RABB.